(12) United States Patent
Hu et al.

(10) Patent No.: US 11,574,012 B2
(45) Date of Patent: Feb. 7, 2023

(54) ERROR CORRECTION METHOD AND DEVICE FOR SEARCH TERM

(71) Applicant: BEIJING QIYI CENTURY SCIENCE & TECHNOLOGY CO., LTD., Beijing (CN)

(72) Inventors: Jun Hu, Beijing (CN); Yingjie Chen, Beijing (CN); Tianchang Wang, Beijing (CN); Chengcan Ye, Beijing (CN)

(73) Assignee: BEIJING QIYI CENTURY SCIENCE & TECHNOLOGY CO., LTD., Beijing (CN)

( * ) Notice: Subject to any disclaimer, the term of this patent is extended or adjusted under 35 U.S.C. 154(b) by 586 days.

(21) Appl. No.: 16/315,193

(22) PCT Filed: Aug. 14, 2017

(86) PCT No.: PCT/CN2017/097357
§ 371 (c)(1),
(2) Date: Jan. 4, 2019

(87) PCT Pub. No.: WO2018/040899
PCT Pub. Date: Mar. 8, 2018

(65) Prior Publication Data
US 2019/0179855 A1    Jun. 13, 2019

(30) Foreign Application Priority Data
Aug. 31, 2016    (CN) .......................... 201610799830.4

(51) Int. Cl.
*G06F 16/9032*    (2019.01)
*G06F 16/9532*    (2019.01)
*G06F 40/232*     (2020.01)

(52) U.S. Cl.
CPC .... *G06F 16/90324* (2019.01); *G06F 16/9532* (2019.01); *G06F 40/232* (2020.01)

(58) Field of Classification Search
CPC ......................... G06F 16/90324; G06F 40/232
See application file for complete search history.

(56) References Cited

U.S. PATENT DOCUMENTS 6,073,099 A * 6/2000 Sabourin ............... G10L 15/187
                                                 704/254
7,130,487 B1 * 10/2006 Imagawa ................. G06K 9/72
                                                 382/280

(Continued)

FOREIGN PATENT DOCUMENTS

CN    101777042    7/2010
CN    102063508    5/2011

(Continued)

OTHER PUBLICATIONS

AU Application No. 2617317878, Second Office Action dated Apr. 17, 2020.

(Continued)

*Primary Examiner* — Taelor Kim
(74) *Attorney, Agent, or Firm* — Alston & Bird LLP

(57) ABSTRACT

The present application provides an error correction method and device for search terms. The method comprises: identifying an incorrect search term; calculating weighted edit distances between the search term and pre-obtained hot terms by using a weighted edit distance algorithm, wherein, during the calculation of the weighted edit distances, different weights are set respectively for the following operations of transforming from the search term to the hot terms: an operation of inserting characters, an operation of deleting characters, an operation of replacing by characters with similar appearance or pronunciation, an operation of replacing by characters with dissimilar appearance or pronuncia- (Continued)

tion, and an operation of exchanging characters; and selecting a predetermined number of hot terms based on the weighted edit distances and popularity of the hot terms for error correction prompt. The method and device of the present application can improve the error correction accuracy of error search terms.

11 Claims, 3 Drawing Sheets

(56) References Cited

U.S. PATENT DOCUMENTS

| | | | |
|---|---|---|---|
| 7,321,892 B2* | 1/2008 | Vadon | G06F 40/232 |
| | | | 707/767 |
| 7,617,202 B2* | 11/2009 | Brill | G06F 16/9535 |
| 7,644,075 B2 | 1/2010 | Zeng et al. | |
| 2007/0038615 A1* | 2/2007 | Vadon | G06F 40/232 |
| 2008/0104056 A1 | 5/2008 | Li et al. | |
| 2009/0083255 A1 | 3/2009 | Li | |
| 2013/0124492 A1 | 5/2013 | Gao et al. | |
| 2014/0298168 A1* | 10/2014 | Son | G06F 40/232 |
| | | | 715/257 |

FOREIGN PATENT DOCUMENTS

| | | |
|---|---|---|
| CN | 101916263 B | 10/2012 |
| CN | 102831177 | 12/2012 |
| CN | 102915314 A | 2/2013 |
| CN | 102063508 B | 6/2013 |
| CN | 103399907 | 11/2013 |
| CN | 103927329 | 7/2014 |
| CN | 106326484 | 1/2017 |
| JP | H09114831 A | 5/1997 |
| JP | 2010123005 A | 6/2010 |
| WO | WO 2015/040793 A1 | 3/2015 |
| WO | WO 2016/110455 A1 | 7/2016 |

OTHER PUBLICATIONS

International Search Report and Written Opinion for Application No. PCT/CN2017/097357 dated Oct. 27, 2017.
"Damerau-Levenshtein distance," Wikipedia, 6 pages, (2016). [Retrieved from the Internet Jul. 26, 2019: <URL: https://en.wikipedia.org/w/index.php?title=Damerau-Levenshtein_distance&oldid=731769632>]. [Author Unknown].
Abandalt et al., "A word matching algorithm in handwritten Arabic recognition using multiple-sequence weighted edit distances," IJCSI International Journal of Computer Science Issues, 11(3):18-26, (2014).
Ahmad et al., "Learning a Spelling Error Model from Search Query Logs," Proceedings of Human Language Technology Conference and Conference on Empirical Methods in Natural Language Processing (HLT/EMNLP), Association for Computational Linguistics, pp. 955-962, (2005).
Cucerzan et al., "Spelling correction as an iterative process that exploits the collective knowledge of web users," Proceedings of the Conference on Empirical Methods in Natural language Processing, 293-300, (2004).
Gueddah et al., "The impact of Arabic inter-character proximity and similarity on spell-checking," Intelligent Systems: Theories and Applications (SITA), 2013 8th International Conference on May 8, 2013, 4 pages, (2013).
Li et al., "Exploring Distributional Similarity Based Models for Query Spelling Correction," Proceedings of the 21st International Conference on Computational Linguistics and 44th Annual Meeting of the ACL, Association for Computational Linguistics, pp. 1025-1032, (2006).
EP Application No. 17845261.7, EPO Supplementary European Search Report and European Search Opinion dated Aug. 2, 2019.
JP Application No. 2019-526358, First Office Action dated Feb. 18, 2020.
Notice of Allowance for Korean Patent Application No. 10-2019-7001982 dated Dec. 21, 2020.

* cited by examiner

ERROR CORRECTION METHOD AND DEVICE FOR SEARCH TERM

CROSS-REFERENCE TO RELATED APPLICATIONS

The present application is a national phase application under 35 U.S.C. § 371 of International Application No. PCT/CN2017/097357 filed Aug. 14, 2017, which claims priority to a Chinese patent application No. 201610799830.4, filed on Aug. 31, 2016 and entitled "ERROR CORRECTION METHOD AND DEVICE FOR SEARCH TERM". The entire contents of each of the above-referenced applications are incorporated into the present application by reference.

TECHNICAL FIELD

The present application relates to the field of computer technology, and particularly to an error correction method and device for search terms.

BACKGROUND

Search terms input by users usually contain many typos, which leads to search results not meeting the needs of the users. Reasons for incorrect search terms are relatively complicated, mainly including: homophone selection errors, misspellings of Pinyin, glyph input errors and the like. In order to solve the above problems, error correction prompt may be used. It prompts a user, in a search page, that search terms input by the user may be inaccurate and recommends the possible relevant search terms based on the input search terms. In most of the conventional error correction techniques, an original term with terms in a dictionary are compared by using the edit distance technology and then K terms with the smallest edit distance from the original term are selected. Edit operations comprise: 1) replacement of one character with another character, 2) insertion of one character, 3) deletion of one character. Such edit operations do not take into account relationships between replacement characters. In many cases, the effect of such conventional edit distance technologies is not very good.

SUMMARY OF THE INVENTION

In order to improve the accuracy of error correction, embodiments of the present application provide an error correction method and device for search terms.

According to one aspect of the present application, an error correction method for search terms is provided, which may comprise: identifying an incorrect search term; calculating weighted edit distances between the search term and pre-obtained hot terms by using a weighted edit distance algorithm, wherein, during the calculation of the weighted edit distances, different weights are set respectively for the following operations of transforming from the search term to the hot terms: an operation of inserting characters, an operation of deleting characters, an operation of replacing by characters with similar appearance or pronunciation, an operation of replacing by characters with dissimilar appearance or pronunciation, and an operation of exchanging characters; and selecting a predetermined number of hot terms based on the weighted edit distances and popularity of the hot terms for error correction prompt.

Optionally, calculating weighted edit distances between the search term and pre-obtained hot terms by using a weighted edit distance algorithm comprises: defining a state transition equation for representing the weighted edit distances between the search term and the hot terms, wherein two state variables in the state transition equation are defined, which are used to represent characters at corresponding positions between a search term and a hot term respectively; solving the state transition equation in respective operations based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters; and obtaining the weighted edit distances based on solutions of the state transition equation.

Optionally, the state transition equation is: $edit(i,j) = \min\{edit(i-1,j)+1, edit(i,j-1)+1, edit(i-1,j-1)+f(i,j)\}$; wherein i and j are the two state variables, $f(i,j)$ is a cost of an operation, and costs $f(i,j)$ corresponding to the respective weights are obtained based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters.

Optionally, the method further comprises determining whether the search term and the hot terms are characters with similar appearance or pronunciation by searching in a preset mapping table of characters with similar appearance or a preset mapping table of characters with similar pronunciation.

Optionally, the method further comprises setting weights of the operations based on the following relationship: the weight for an operation of replacing by characters with similar appearance or pronunciation<the weight for an operation of exchanging characters<the weight for an operation of inserting characters=the weight for an operation of deleting characters=the weight for an operation of replacing by characters with dissimilar appearance or pronunciation.

Optionally, identifying an incorrect search term comprises analyzing or calculating, for a search term to be identified, a click rate for searching, term features, an occurrence probability, the number of full matching results, and a full matching ratio based on search logs; and determining the search term to be identified as an incorrect search term or a normal search term based on the click rate for searching, the term features, the occurrence probability, the number of full matching results, and the full matching ratio for the search term to be identified.

Optionally, selecting a predetermined number of hot terms according to the weighted edit distances and popularity of the hot terms for error correction prompt comprises: normalizing the number of searches for the hot terms; calculating recommendation comprehensive scores based on the weighted edit distances and results of normalizing the number of searches for the hot terms; and selecting a predetermined number of hot terms with the highest recommendation comprehensive score and with weighted edit distances less than a preset value, as recommendation terms for error correction to perform error correction prompt.

According to another aspect of the present application, a method for calculating a weighted edit distance is provided, which may comprise: obtaining a source string and a target string; and calculating a weighted edit distance between the source string and the target string, wherein during the calculation of the weighted edit distance, different weights are set for different operations of transforming from the source string to the target string, respectively.

Optionally, calculating a weighted edit distance between the source string and the target string comprises: defining a state transition equation for representing the weighted edit distance between the source string and the target string, wherein, two state variables in the state transition equation are defined, which are used to represent characters at corresponding positions between the source string and the target string respectively; solving the state transition equation in respective operations based on the different weights that are set for different operations; and obtaining the weighted edit distance based on the solutions of the state transition equation.

According to yet another aspect of the present application, an error correction device for search terms is provided, which may comprise: an incorrect search term identification unit for identifying an incorrect search term; a weighted edit distance calculation unit for calculating weighted edit distances between the search term and pre-obtained hot terms by using a weighted edit distance algorithm, wherein, during the calculation of the weighted edit distances, different weights are set respectively for the following operations of transforming from the search term to the hot terms: an operation of inserting characters, an operation of deleting characters, an operation of replacing by characters with similar appearance or pronunciation, an operation of replacing by characters with dissimilar appearance or pronunciation, and an operation of exchanging characters; and an error correction prompting unit for selecting a predetermined number of hot terms based on the weighted edit distances and popularity of the hot terms for error correction prompt.

Optionally, the weighted edit distance calculation unit comprises: a state transition equation defining subunit for defining a state transition equation for representing the weighted edit distances between the search term and the hot terms, wherein two state variables in the state transition equation are defined, which are used to represent characters at corresponding positions between a search term and a hot term respectively; and an equation solving subunit for solving the state transition equation in respective operations based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters and using the obtained solutions as the weighted edit distances.

Optionally, the state transition equation is: $edit(i,j)=\min\{edit(i-1,j)+1, edit(i,j-1)+1, edit(i-1,j-1)+f(i,j)\}$; wherein i and j are the two state variables, $f(i,j)$ is a cost of an operation, and costs $f(i,j)$ corresponding to the respective weights are obtained based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters.

Optionally, the device further comprises: a characters with similar appearance or pronunciation determination unit for determining whether the search term and the hot terms are characters with similar appearance or pronunciation by searching in a preset mapping table of characters with similar appearance or a preset mapping table of characters with similar pronunciation.

Optionally, the device further comprises: an operation weight setting unit for setting weights of the operations based on the following relationship: the weight for an operation of replacing by characters with similar appearance or pronunciation<the weight for an operation of exchanging characters<the weight for an operation of inserting characters=the weight for an operation of deleting characters=the weight for an operation of replacing by characters with dissimilar appearance or pronunciation.

Optionally, the incorrect search term identification unit comprises: a log search and calculation subunit for analyzing or calculating, for a search term to be identified, a click rate for searching, term features, an occurrence probability, the number of full matching results, and a full matching ratio based on search logs; and an identification result determination subunit for determining the search term to be identified as an incorrect search term or a normal search term based on the click rate for searching, the term features, the occurrence probability, the number of full matching results, and the full matching ratio for the search term to be identified.

Optionally, the error correction prompting unit comprises: a normalization processing subunit for normalizing the number of searches for the hot terms; a recommendation comprehensive score calculation subunit for calculating recommendation comprehensive scores based on the weighted edit distances and results of normalizing the number of searches for the hot terms; and a recommendation term determination subunit for selecting a predetermined number of hot terms with the highest recommendation comprehensive score and with weighted edit distances less than a preset value, as recommendation terms for error correction to perform error correction prompt.

According to still another aspect of the present application, a device for calculating weighted edit distances is provided, which may comprise: an obtaining unit for obtaining a source string and a target string; and a calculation unit for calculating a weighted edit distance between the source string and the target string, wherein during the calculation of the weighted edit distance, different weights are set for different operations of transforming from the source string to the target string, respectively.

Optionally, the calculation unit comprises: a state transition equation definition subunit for defining a state transition equation for representing the weighted edit distance between the source string and the target string, wherein, two state variables in the state transition equation are defined, which are used to represent characters at corresponding positions between the source string and the target string respectively; and a state transition equation solving subunit for solving the state transition equation in respective operations based on the different weights that are set for different operations and using the obtained solutions as the weighted edit distances.

According to still another aspect of the present application, an embodiment of the present application provides an error correction method for search terms, comprising:

identifying an incorrect search term;

calculating weighted edit distances between the identified search term and pre-obtained hot terms according to different weights that are set for the different operations of transforming from the search term to the hot terms, wherein the operations include: an operation of inserting characters, an operation of deleting characters, an operation of replacing by characters with similar appearance or pronunciation, an operation of replacing by characters with dissimilar appearance or pronunciation, and an operation of exchanging characters;

selecting, from the pre-obtained hot terms, a predetermined number of hot terms based on the weighted edit distances and popularity of the pre-obtained hot terms for error correction prompt.

Optionally, calculating weighted edit distances between the identified search term and pre-obtained hot terms according to different weights that are set for the different operations of transforming from the search term to the hot terms comprises:

defining a state transition equation for representing the weighted edit distances between the identified search term and the pre-obtained hot terms, wherein two state variables in the state transition equation are defined, which are used to represent characters at a corresponding position between the identified search term and the pre-obtained hot terms respectively;

solving the state transition equation in respective operations based on the different weights that are preset for an operation of inserting characters, an operation of deleting characters, an operation of replacing by characters with similar appearance or pronunciation, an operation of replacing by characters with dissimilar appearance or pronunciation, and an operation of exchanging characters;

obtaining the weighted edit distances based on the solutions of the state transition equation.

Optionally, the state transition equation is:

$$\text{edit}(i,j)=\min\{\text{edit}(i-1,j)+1,\text{edit}(i,j-1)+1,\text{edit}(i-1,j-1)+f(i,j),\};$$

wherein i and j are the two state variables, $f(i,j)$ is a cost of an operation, and costs $f(i,j)$ corresponding to the respective weights are obtained based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters.

Optionally, the operation of replacing by characters with similar appearance or pronunciation comprises:

determining whether the search term and the hot terms are characters with similar appearance or pronunciation by searching in a preset mapping table of characters with similar appearance or a preset mapping table of characters with similar pronunciation.

Optionally, the different weights that are preset for the operations of a transforming from the search term to the hot terms are based on the following relationship:

the weight for an operation of replacing by characters with similar appearance or pronunciation<the weight for an operation of exchanging characters<the weight for an operation of inserting characters=the weight for an operation of deleting characters=the weight for an operation of replacing by characters with dissimilar appearance or pronunciation.

Optionally, identifying an incorrect search term comprises:

analyzing or calculating, for a search term to be identified, a click rate for searching, term features, an occurrence probability, the number of full matching results, and a full matching ratio based on search logs; and determining the search term to be identified as an incorrect search term based on the click rate for searching, the term features, the occurrence probability, the number of full matching results, and the full matching ratio for the search term to be identified.

Optionally, selecting, from the pre-obtained hot terms, a predetermined number of hot terms based on the weighted edit distances and popularity of the pre-obtained hot terms for error correction prompt comprises:

normalizing the number of searches for the pre-obtained hot terms;

calculating recommendation comprehensive scores based on the weighted edit distances and results of normalizing the number of searches for the hot terms; and selecting, from the pre-obtained hot terms, a predetermined number of hot terms with the highest recommendation comprehensive score and with weighted edit distances less than a preset value, as recommendation terms for error correction to perform error correction prompt.

According to another aspect of the present application, an embodiment of the present application provides a method for calculating a weighted edit distance, comprising:

obtaining a source string and a target string;

setting different weights respectively for different operations of a transforming from the source string to the target string, and calculating the weighted edit distance between the source string and the target string based on the different weights that are set for the different operations.

Optionally, calculating the weighted edit distance between the source string and the target string based on the different weights that are set for the different operations comprises:

defining a state transition equation for representing the weighted edit distance between the source string and the target string, wherein, two state variables in the state transition equation are defined, which are used to represent characters at corresponding positions between the source string and the target string respectively;

solving the state transition equation in respective operations based on the different weights that are set for different operations; and obtaining the weighted edit distance based on the solutions of the state transition equation.

According to still another aspect of the present application, an embodiment of the present application provides an error correction device for search terms, comprising:

an incorrect search term identification unit for identifying an incorrect search term;

a weighted edit distance calculation unit for calculating weighted edit distances between the identified search term and pre-obtained hot terms according to different weights that are set for the different operations of transforming from the search term to the hot terms, wherein the operations include: an operation of inserting characters, an operation of deleting characters, an operation of replacing by characters with similar appearance or pronunciation, an operation of replacing by characters with dissimilar appearance or pronunciation, and an operation of exchanging characters; and an error correction prompting unit for selecting, from the pre-obtained hot terms, a predetermined number of hot terms based on the weighted edit distances and popularity of the pre-obtained hot terms for error correction prompt.

The weighted edit distance calculation unit comprises:

a state transition equation defining subunit for defining a state transition equation for representing the weighted edit distances between the identified search term and the pre-obtained hot terms, wherein two state variables in the state transition equation are defined, which are used to represent characters at a corresponding position between the identified search term and the pre-obtained hot terms respectively; and an equation solving subunit for solving the state transition equation in respective operations based on the different weights that are preset for an operation of inserting characters, an operation of deleting characters, an operation of replacing by characters with similar appearance or pronunciation, an operation of replacing by characters with dissimilar appearance or pronunciation, and an operation of exchanging characters and obtaining the weighted edit distances based on the solutions of the state transition equation.

Optionally, the state transition equation is:

$$edit(i,j)=\min\{edit(i-1,j)+1, edit(i,j-1)+1, edit(i-1,j-1)+f(i,j)\};$$

wherein i and j are the two state variables, f(i,j) is a cost of an operation, and costs f(i,j) corresponding to the respective weights are obtained based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters.

Optionally, the operation of replacing by characters with similar appearance or pronunciation comprises:

determining whether the search term and the hot terms are characters with similar appearance or pronunciation by searching in a preset mapping table of characters with similar appearance or a preset mapping table of characters with similar pronunciation.

Optionally, the different weights that are preset for the operations of a transforming from the search term to the hot terms are based on the following relationship:

the weight for an operation of replacing by characters with similar appearance or pronunciation<the weight for an operation of exchanging characters<the weight for an operation of inserting characters=the weight for an operation of deleting characters=the weight for an operation of replacing by characters with dissimilar appearance or pronunciation.

Optionally, the incorrect search term identification unit comprises:

a log search and calculation subunit for analyzing or calculating, for a search term to be identified, a click rate for searching, term features, an occurrence probability, the number of full matching results, and a full matching ratio based on search logs; and an identification result determination subunit for determining the search term to be identified as an incorrect search term based on the click rate for searching, the term features, the occurrence probability, the number of full matching results, and the full matching ratio for the search term to be identified.

Optionally, the error correction prompting unit comprises:

a normalization subunit for normalizing the number of searches for the pre-obtained hot terms;

a recommendation comprehensive score calculation subunit for calculating recommendation comprehensive scores based on the weighted edit distances and results of normalizing the number of searches for the hot terms; and a recommendation term determination subunit for selecting, from the pre-obtained hot terms, a predetermined number of hot terms with the highest recommendation comprehensive score and with weighted edit distances less than a preset value, as recommendation terms for error correction to perform error correction prompt.

According to another aspect of the present application, an embodiment of the present application provides a device for calculating a weighted edit distance. The device comprises:

an obtaining unit for obtaining a source string and a target string;

a calculation unit for setting different weights respectively for different operations of a transforming from the source string to the target string, and calculating the weighted edit distance between the source string and the target string based on the different weights set for the different operations.

Optionally, the calculation unit may comprise:

a state transition equation definition subunit for defining a state transition equation for representing the weighted edit distance between the source string and the target string, wherein, two state variables in the state transition equation are defined, which are used to represent characters at corresponding positions between the source string and the target string respectively; and a state transition equation solving subunit for solving the state transition equation in respective operations based on the different weights that are set for different operations, and obtaining the weighted edit distances based on the solutions of the state transition equation.

According to yet another aspect of the present application, an embodiment of the present application discloses an electronic device, comprising a first processor, a first communication interface, a first memory and a first communication bus, wherein the first processor, the first communication interface and the first memory communicate with each other via the first communication bus; the first memory is used for storing computer programs; the first processor is used for executing the programs stored on the first memory so as to implement the steps of the aforementioned error correction method for search terms.

According to still another aspect of the present application, an embodiment of the present application further discloses a computer-readable storage medium with computer programs stored thereon, and when being executed by a processor, the computer programs enable the processor to implement the steps of the aforementioned error correction method for search terms.

According to yet another aspect of the present application, an embodiment of the present application further discloses an electronic device, comprising a second processor, a second communication interface, a second memory and a second communication bus, wherein the second processor, the second communication interface and the second memory communicate with each other via the second communication bus; the second memory is used for storing computer programs; the second processor is used for, when executing the programs stored on the second memory, implementing the steps of the aforementioned method for calculating a weighted edit distance.

According to still another aspect of the present application, an embodiment of the present application further discloses a computer-readable storage medium with computer programs stored thereon, and when being executed by a processor, the computer programs enable the processor to implement the steps of the aforementioned method for calculating a weighted edit distance.

It can be seen that the embodiments of the present application provide an error correction method and device for search terms based on the weighted edit distance. By setting different weights for an operation of inserting characters, an operation of deleting characters, an operation of replacing by characters with similar appearance or pronunciation, an operation of replacing by characters with dissimilar appearance or pronunciation, and an operation of exchanging characters, all of the operations that may be involved in the transforming process from a search term to a hot term are adequately covered during the weighted edit distance calculation. Thus, the weighted edit distance between a search term and a hot term can be calculated more quickly and accurately, thereby improving the accuracy of search term error correction.

BRIEF DESCRIPTION OF THE DRAWINGS

In order to explain the technical solutions of embodiments of the present application and technical solutions in the prior art more clearly, a brief introduction of the drawings required in the embodiments and in the prior art will be given below. Obviously, the drawings described below are just for some embodiments of the present application, and other drawings may be obtained by those of ordinary skill in the art without any creative efforts based on these drawings.

DETAILED DESCRIPTION OF THE INVENTION

In order to make the objectives, technical solutions and advantages of the present application more clear, description will be give below for the present application in more details with reference to the drawings and embodiments. Obviously, the described embodiments are merely part of the embodiments of the present application instead of all of the embodiments. All other embodiments obtained by those of ordinary skill in the art based on the embodiments of the present application without any creative efforts falls into the protection scope of the present application.

As previously analyzed, in the error correction solutions based on an edit distance in the prior art, neither the relationship between the replacement characters, such as characters with similar appearance, characters with similar pronunciation, etc., nor the operations of exchanges between the adjacent characters in a string are taken into consideration. Thus, the effect of such conventional edit distance is not ideal.

Embodiments of the present application provide an error correction method and device for search terms based on a weighted edit distance. By setting different weights respectively for an operation of inserting characters, an operation of deleting characters, an operation of replacing by characters with similar appearance or pronunciation, an operation of replacing by characters with dissimilar appearance or pronunciation, and an operation of exchanging characters, all of the operations that may be involved in the transforming process from a search term to a hot term are adequately covered during the weighted edit distance calculation. Thus, the weighted edit distance between a search term and a hot term can be calculated more quickly and accurately, thereby improving the accuracy of search term error correction.

Figure 1:
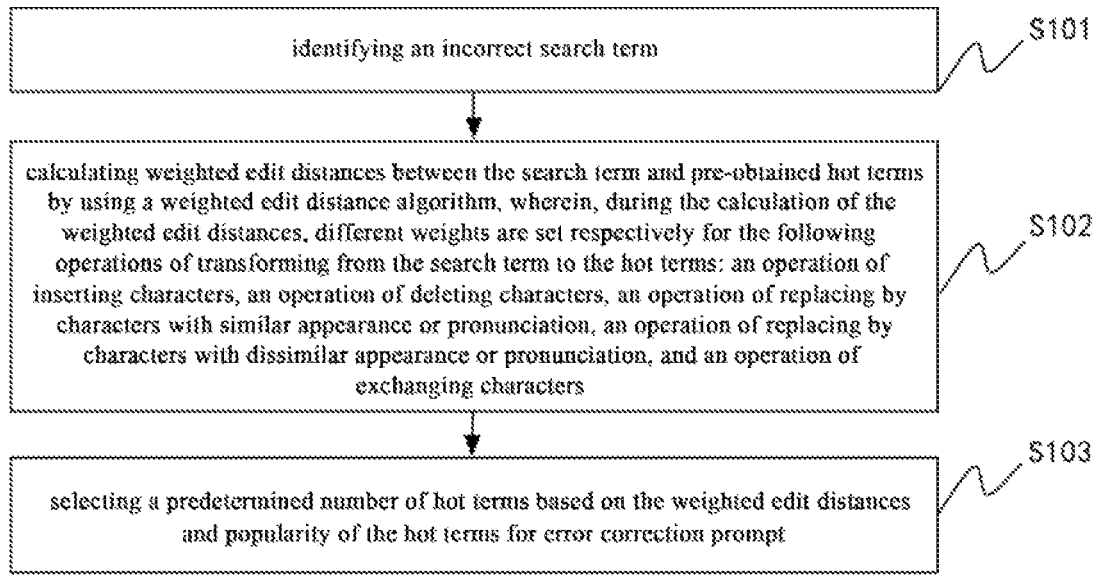
FIG. 1 is a flowchart of an error correction method for search terms provided by an embodiment of the present application.

Refer to FIG. 1, which is a flowchart of an error correction method for search terms provided by an embodiment of the present application, the method comprises:

S101: identifying an incorrect search term.

Firstly, it is needed to identify the incorrect search term since the error correction for a search term is the error correction for an incorrect search term. There are many cases that result in incorrect search terms, for example, search terms due to homophone selection errors, misspellings of Pinyin, glyph input errors, which leads to search results not meeting the needs of users. In a particular implementation, incorrect search terms can be identified based on search logs: the incorrect search terms can be effectively identified via a click rate for searching, the number of full matching search results and probability of the search terms based on a language model.

In an embodiment of the present application, a method for identifying an incorrect search term is provided, which comprises the following steps 1-2:

Step 1, analyzing or calculating, for a search term to be identified, a click rate for searching, term features, an occurrence probability, the number of full matching results, and a full matching ratio based on search logs.

Specifically:

Firstly, the click rate for searching of a search term to be identified is calculated. For example, the number of times that the search term to be identified was searched by users and the number of times that the search results were clicked by users may be obtained from search logs; the click rate for searching may be obtained by dividing the number of times that the search results were clicked by the number of searches.

Secondly, the search term to be identified is segmented to obtain a plurality of term features.

Afterwards, the probability of occurrence of the search term to be identified is calculated using a statistical language model and various term features.

Then, the number of full matching results and the number of relevant results of the search term to be identified are calculated, wherein, the number of full matching results is the number of the results, which contain the entire content of the search term to be identified, among all the search results for the search term to be identified; the number of relevant results is the number of the results, which contain part of the content of the search term to be identified, among all the search results for the search term to be identified.

For example: the search term to be identified is "camera that can be controlled remotely", part of the content of the search term to be identified is "camera", in the search results, the number of the results containing "camera that can be controlled remotely" is 10, and the number of the results containing "camera" is 15.

Thus, the number of full matching results is 10 and the number of relevant results is 15.

Finally, the ratio of the number of full matching results and the number of relevant results is calculated to obtain the full matching ratio.

Step 2, determining the search term to be identified as an incorrect search term or a normal search term based on the click rate for searching, the term features, the occurrence probability, the number of full matching results, and the full matching ratio for the search term to be identified.

Features of the search term to be identified can be merged into a multi-dimensional feature, the multi-dimensional feature of the search term to be identified may include several of the following: the click rate for searching, all of the term features, the occurrence probability of the search term to be identified, the number of full matching results and full matching ratio. The search term to be identified can be identified based on the multi-dimensional feature, which may reduce the difficulty of identifying the search term to be identified and thereby improves the ability to identify the search term to be identified and is advantageous to identify whether the search term to be identified as an incorrect search term.

S102: calculating weighted edit distances between the search term and pre-obtained hot terms by using a weighted edit distance algorithm, wherein, during the calculation of the weighted edit distances, different weights are set respectively for the following operations of transforming from the search term to the hot terms: an operation of inserting characters, an operation of deleting characters, an operation of replacing by characters with similar appearance or pronunciation, an operation of replacing by characters with dissimilar appearance or pronunciation, and an operation of exchanging characters.

A hot term is a word that is very popular in real world or on the Internet. In practical operations, a large number of hot terms can be determined by the click-through rate to form a hot term list. During the creation of the hot term list, hot terms with a low click-through rate and less search results should be filtered out to ensure the accuracy of hot terms. In an embodiment of the present application, the incorrect search term is corrected to hot terms with a small edit distance, thereby providing a better user experience.

As can be understood by those skilled in the art, the edit distance, also referred to as Levenshtein distance, refers to the minimum number of edition operations required to transform one string into the other. Conventional edit operations comprise: replacing one character by another character, inserting one character, deleting one character. Generally, the smaller the edit distance is, the greater the similarity of the two strings will be.

Conventional edit distance operations may include: replacing one character by another character, inserting one character, deleting one character, and each of the operations corresponds to an edit distance of 1. These operations neither include exchanges of adjacent characters in a string, nor take into account the particularity of replacement operations of characters with similar appearance or pronunciation. An exchange operation can be done by two replacement operations. For example, CD→DD→DC, the corresponding distance is 2 according to conventional edit distance algorithms. Considering that the probability that users input two characters with their positions exchanged is very high in the actual search process, it is unreasonable to have a distance of 2 for exchange operations. Furthermore, since the probability that users input incorrect search terms due to the characters with similar appearance or pronunciation is also higher, it is obviously unreasonable to set a distance of 1 for such special replacement operations without any particular treatment.

To this end, an embodiment of the present application provides a method for calculating a weighted edit distance, including the following five operations with their weights set respectively.

1) the weight of an operation of inserting characters is set to 1;

2) the weight of an operation of deleting characters is set to 1;

3) the weight of an operation of replacing by characters with dissimilar appearance or pronunciation is set to 1;

4) the weight of an operation of replacing by characters with similar appearance or pronunciation is set to w1;

5) the weight of an operation of exchanging characters is set to w2.

In order to obtain a better effect, special attention must be paid to the values of w1 and w2, in general, they need to meet w1<w2<1. It is concluded by experiments that, optionally, the operation weights can be set based on the following relationship: the weight for an operation of replacing by characters with similar appearance or pronunciation<the weight for an operation of exchanging characters<the weight for an operation of inserting characters=the weight for an operation of deleting characters=the weight for an operation of replacing by characters with dissimilar appearance or pronunciation.

Various possible operations are considered and given different weights respectively, as a result, by applying such weighted edit distance to perform error correction, a higher accuracy of the similarity calculated between strings can be obtained.

Accordingly, from another aspect, a method for calculating a weighted edit distance provided by an embodiment of the present application may include:

obtaining a source string and a target string; and calculating a weighted edit distance between the source string and the target string, wherein during the calculation of the weighted edit distance, different weights are set for different operations of transforming from the source string to the target string, respectively.

By the weighted edit distance (also known as "dynamic programming"), different weights can be set for different operations to solve the above problems. Its idea is to describe states of the operations and solve the state transition equation.

The problems of edit distances involve a source string (str1, the search term in this embodiment) and a target string (str2, the hot term in this embodiment), it is obvious that one state variable cannot describe the binary relationship of the transforming from the source string to the target string by calculating the weighted edit distance. Thus, two state variables i and j are used to describe one state in the process of the transition from the source string to the target string. The optimum edit distance from 1→i of the source string str1 to 1→j of the target string str2 is represented by edit (i, j), wherein 1→i represents a substring with a length of i in the source string, 1→j represents a substring with a length of j in the target string. A state transition equation is needed for the transition from the source string to the target string, namely, the transition manner from these sub-states of ti<i and tj<j to states of i and j, wherein, the sub-states are the states of the source string and the target string before calculating the edit distance. In particular, ti<i represents the state of the source string when the source string has not been transformed to the target string, tj<j represents the state of the target string when the source string has not been transformed to the target string, and states of i and j represent the states of the source string and the target string respectively after the edit distance is calculated. Operations of the weighted edit distance in the embodiments of the present application include an operation of inserting characters, an operation of deleting characters, an operation of replacing by characters with similar appearance or pronunciation, an operation of replacing by characters with dissimilar appearance or pronunciation, and an operation of exchanging characters, then sub-states are transitioned to current states by way of such five operations and the current states are the states of i and j. It should be noted that, the values of i and j in the embodiments of the present application are integers.

Figure 2:
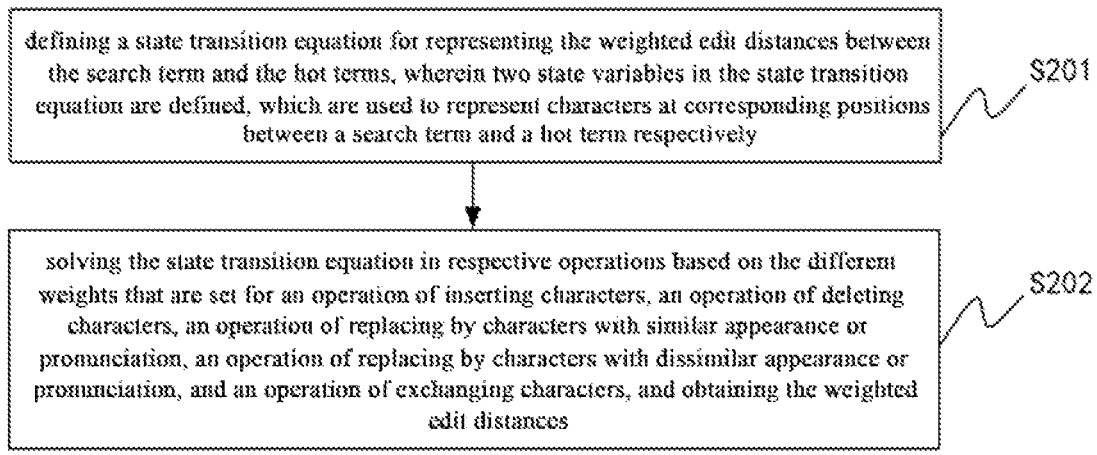
FIG. 2 is a flowchart of a method for calculating a weighted edit distance provided by an embodiment of the present application.

Refer to FIG. 2, which is a flowchart of a method for calculating a weighted edit distance provided by an embodiment of the present application, the method comprises:

S201: defining a state transition equation for representing the weighted edit distances between the search term and the hot terms, wherein two state variables in the state transition equation are defined, which are used to represent characters at corresponding positions between a search term and a hot term respectively;

S202: solving the state transition equation in respective operations based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters, and obtaining the weighted edit distances based on solutions of the state transition equation.

In an embodiment of the present application, the similarity between a hot term and an incorrect search term is obtained by using a weighted edit distance algorithm. Firstly, a state transition equation is defined, wherein edit(i,j) is used to represent the weighted edit distance from the substring with a length of i in a first string to the substring with a length of j in a second string, $str1(i)$ represents the $(i+1)$th character of the first string, and $str2(j)$ represents the $(j+1)$th character of the second string. A logical implementation example of the method for calculating a weighted edit distance based on dynamic programming is provided below.

A. if $i==0$ and $j==0$, $edit(i,j)=0$;
B. if $i==0$ and $j>0$, $edit(i,j)=j$;
C. if $i>0$ and $j==0$, $edit(i,j)=i$;
D. if $i\geq 1$ and $j\geq 1$, $edit(i,j)=\min\{edit(i-1,j)+1, edit(i,j-1)+1, edit(i-1,j-1)+f(i,j)\}$, wherein:

D1. if $str1(i-1)==str2(j-1)$, $f(i,j)=0$
D2. if $str1(i-1)$ and $str2(j-1)$ are characters with similar appearance or pronunciation, $f(i,j)=w1$
D3. if $i\geq 2$ and $j\geq 2$ and $str1(i-2)==str2(j-1)$ and $str1(i-1)==str2(j-2)$, $f(i,j)=1-w2$
D4. else, $f(i,j)=1$ wherein, steps A, B and C indicate the initialization of the function of edit (i, j), step D1 indicates that the character $str1(i-1)$ is the same as the character $str2(j-1)$, step D2 indicates an operation of replacing by the character $str1(i-1)$ and the character $str2(j-1)$ when they are characters with similar appearance or pronunciation, step D3 indicates an operation of exchanging, and step D4 indicates an operation of insertions, deletions and replacing by characters with dissimilar appearance or pronunciation; $f(i,j)$ is a cost of an operation, and costs $f(i,j)$ corresponding to the respective weights are obtained based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters. According to this, the edit distance between an incorrect search term and a hot term can be calculated.

In step D2, the operation of replacing by characters with similar appearance or pronunciation may include: determining whether the search term and the hot term are characters with similar appearance or pronunciation according to a preset mapping table of characters with similar appearance or a preset mapping table of characters with similar pronunciation. For example, as to Chinese characters, the mapping table of characters with similar pronunciation can be created by firstly extracting Pinyin of Chinese characters and then finding all of Chinese characters corresponding to the Pinyin. Similarly, for the languages other than Chinese, mapping tables can be created in a similar way.

S103: selecting, from the pre-obtained hot terms, a predetermined number of hot terms based on the weighted edit distances and popularity of the pre-obtained hot terms for error correction prompt.

Specifically, the predetermined number of hot terms selected for error correction are the recommendation terms. The selection of the recommendation terms can be achieved by the following steps: 1. normalizing the number of searches for pre-obtained hot terms; 2. calculating recommendation comprehensive scores based on the weighted edit distances and results of normalizing the number of searches for the pre-obtained hot terms; 3. selecting, from the pre-obtained hot terms, a predetermined number of hot terms with the highest recommendation comprehensive score and with weighted edit distances less than a preset value, as recommendation terms for error correction.

It is necessary to take into account the edit distances and the popularity of the hot terms during the selection of recommendation terms. Assuming that the weighted edit distance is edit_score and the number of searches of a hot term is impression_count, the number of searches of the hot terms is normalized to a value between 0 to 1 by using a logarithmic formula, which for example is $hot\_index=\min(\log(impression\_count+1)/20, 1)$, then, the recommendation comprehensive score is $$final\_score=hot\_index*edit\_score$$

wherein, final_score represents the comprehensive score, and hot_index represents the result of the number of searches of hot terms normalized to a value between 0 to 1.

Finally, select k hot terms with the highest recommendation comprehensive score and with the weighted edit distance less than a preset value, as recommendation terms for error correction prompt to perform error correction prompt.

In order to explain the error correction method for search terms more clearly, an error correction method for search terms provided by embodiments of the present application will be described hereinafter in detail from another aspect.

The error correction method for search terms provided by an embodiment of the present application may comprise the following steps:

identifying an incorrect search term;

calculating weighted edit distances between the identified search term and pre-obtained hot terms according to different weights that are set for the different operations of transforming from the search term to the hot terms, wherein the operations include: an operation of inserting characters, an operation of deleting characters, an operation of replacing by characters with similar appearance or pronunciation, an operation of replacing by characters with dissimilar appearance or pronunciation, and an operation of exchanging characters;

selecting, from the pre-obtained hot terms, a predetermined number of hot terms based on the weighted edit distances and popularity of the pre-obtained hot terms for error correction prompt.

In an implementation of the embodiment of the present application, calculating weighted edit distances between the identified search term and pre-obtained hot terms according to different weights that are set for the different operations of transforming from the search term to the hot terms comprises:

defining a state transition equation for representing the weighted edit distances between the identified search term and the pre-obtained hot terms, wherein two state variables in the state transition equation are defined, which are used to represent characters at a corresponding position between the identified search term and the pre-obtained hot terms respectively;

solving the state transition equation in respective operations based on the different weights that are preset for an operation of inserting characters, an operation of deleting characters, an operation of replacing by characters with similar appearance or pronunciation, an operation of replacing by characters with dissimilar appearance or pronunciation, and an operation of exchanging characters;

obtaining the weighted edit distances based on the solutions of the state transition equation.

In an implementation of the embodiment of the present application, the state transition equation may be:

$$edit(i,j)=\min\{edit(i-1,j)+1, edit(i,j-1)+1, edit(i-1,j-1)+f(i,j)\};$$

wherein i and j are the two state variables, f(i,j) is a cost of an operation, and costs f(i,j) corresponding to the respective weights are obtained based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters.

In an implementation of the embodiment of the present application, the operation of replacing by characters with similar appearance or pronunciation may include:

determining whether the search term and the hot terms are characters with similar appearance or pronunciation by searching in a preset mapping table of characters with similar appearance or a preset mapping table of characters with similar pronunciation.

In an implementation of the embodiment of the present application, the different weights that are preset for the operations of a transforming from the search term to the hot terms are based on the following relationship:

the weight for an operation of replacing by characters with similar appearance or pronunciation<the weight for an operation of exchanging characters<the weight for an operation of inserting characters=the weight for an operation of deleting characters=the weight for an operation of replacing by characters with dissimilar appearance or pronunciation.

In an implementation of the embodiment of the present application, identifying an incorrect search term may include:

analyzing or calculating, for a search term to be identified, a click rate for searching, term features, an occurrence probability, the number of full matching results, and a full matching ratio based on search logs; and determining the search term to be identified as an incorrect search term based on the click rate for searching, the term features, the occurrence probability, the number of full matching results, and the full matching ratio for the search term to be identified.

In an implementation of the embodiment of the present application, selecting, from the pre-obtained hot terms, a predetermined number of hot terms based on the weighted edit distances and popularity of the pre-obtained hot terms for error correction prompt comprises:

normalizing the number of searches for the pre-obtained hot terms;

calculating recommendation comprehensive scores based on the weighted edit distances and results of normalizing the number of searches for the hot terms; and selecting, from the pre-obtained hot terms, a predetermined number of hot terms with the highest recommendation comprehensive score and with weighted edit distances less than a preset value, as recommendation terms for error correction to perform error correction prompt In the embodiment of the present application, by setting different weights for an operation of inserting characters, an operation of deleting characters, an operation of replacing by characters with similar appearance or pronunciation, an operation of replacing by characters with dissimilar appearance or pronunciation, and an operation of exchanging characters, all of the operations that may be involved in the transforming process from a search term to a hot term are adequately covered during the weighted edit distance calculation. Thus, the weighted edit distance between a search term and a hot term can be calculated more quickly and accurately, thereby improving the accuracy of search term error correction.

In order to explain the aforementioned method for calculating a weighted edit distance more clearly, the method for calculating a weighted edit distance provided by the embodiment of the present application will be described hereinafter in detail from another perspective.

The method for calculating a weighted edit distance provided by the embodiment of the present application may comprise the following steps:

obtaining a source string and a target string;

setting different weights respectively for different operations of a transforming from the source string to the target string, and calculating the weighted edit distance between the source string and the target string based on the different weights that are set for the different operations.

It should be noted that when the method for calculating a weighted edit distance described above is used to calculate the weighted edit distance between a search term and a hot term, the source string may be an identified incorrect search term and the target string may be a pre-obtained hot terms.

In an implementation of the embodiment of the present application, calculating the weighted edit distance between the source string and the target string based on the different weights that are set for the different operations may comprise:

defining a state transition equation for representing the weighted edit distance between the source string and the target string, wherein, two state variables in the state transition equation are defined, which are used to represent characters at corresponding positions between the source string and the target string respectively;

solving the state transition equation in respective operations based on the different weights that are set for different operations; and obtaining the weighted edit distance based on the solutions of the state transition equation.

In the embodiments of the present application, since various possible operations are considered are and given different weights respectively, by applying such weighted edit distance to perform error correction, a higher accuracy of the similarity calculated between strings can be obtained.

It should be noted that for the sake of simplicity of description, embodiments of methods are described as a series of action combinations. However, it should be understood by those skilled in the art that the embodiments of the present application are not limited by the order of actions described because certain steps may be performed in other orders or at the same time according to the embodiments of the present application. Besides, it should also be understood by those skilled in the art that all the embodiments described in the specification are optional embodiments, and the actions involved are not necessarily necessary for embodiments of the present application.

Figure 3:
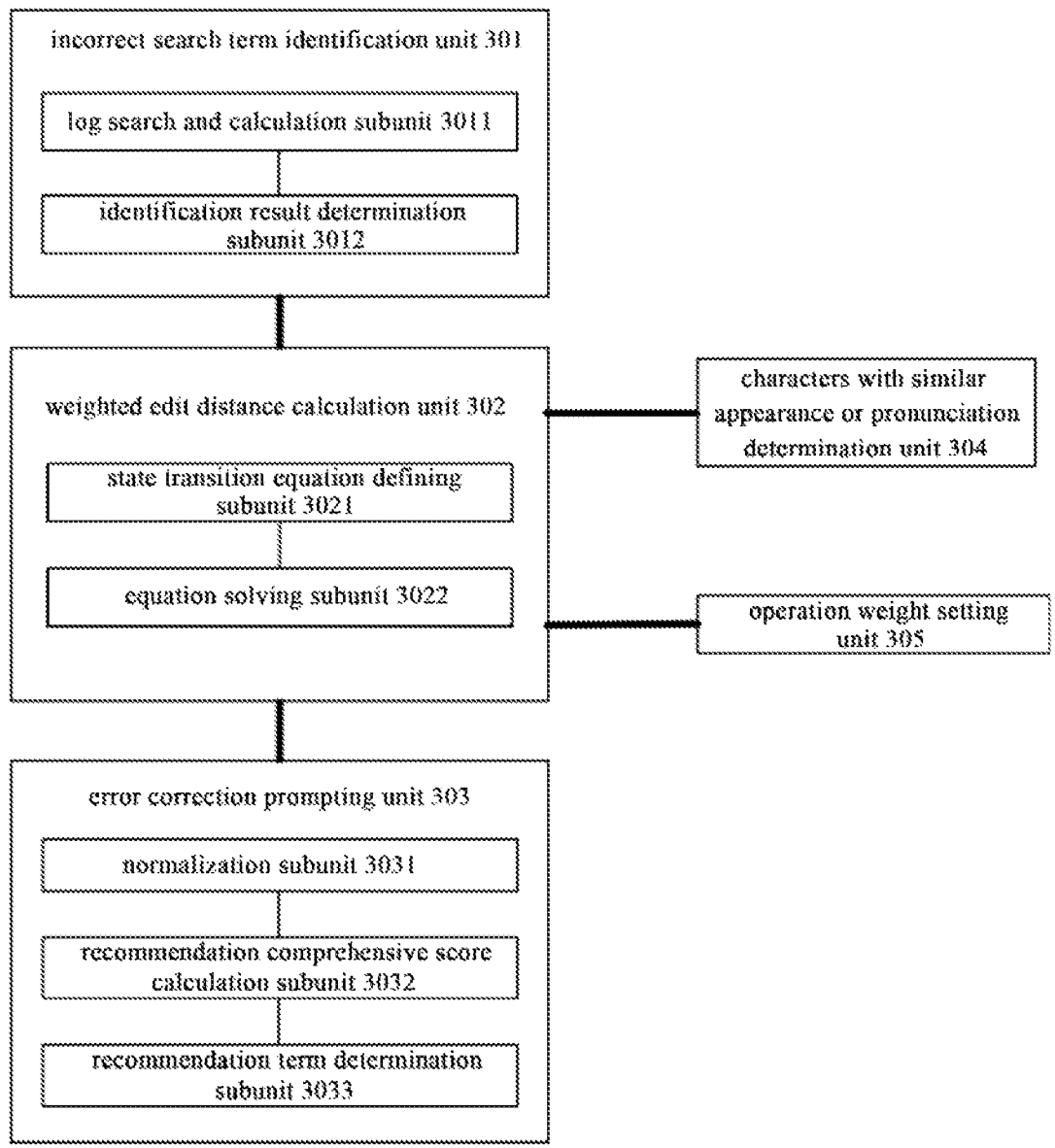
FIG. 3 is a schematic structural diagram of an error correction device for search terms provided by an embodiment of the present application.

Referring to FIG. 3, a schematic structural diagram of an error correction device for search terms provided by an embodiment of the present application is illustrated, and the device comprises:

an incorrect search term identification unit 301 for identifying an incorrect search term;

Firstly, it is needed to identify the incorrect search term since the error correction for a search term is the error correction for an incorrect search term. In a particular embodiment, incorrect search terms can be identified based on search logs: the incorrect search terms can be effectively identified via a click rate for searching, the number of full matching search results and probability of the search terms based on a language model.

A weighted edit distance calculation unit 302 for calculating weighted edit distances between the search term and pre-obtained hot terms by using a weighted edit distance algorithm, wherein, during the calculation of the weighted edit distances, different weights are set respectively for the following operations of transforming from the search term to the hot terms: an operation of inserting characters, an operation of deleting characters, an operation of replacing by characters with similar appearance or pronunciation, an operation of replacing by characters with dissimilar appearance or pronunciation, and an operation of exchanging characters;

A hot term is a word that is very popular in real world or on the Internet. In practical operations, a large number of hot terms can be determined by the click-through rate to form a hot term list. During the creation of the hot term list, hot terms with a low click-through rate and less search results should be filtered out to ensure the accuracy of hot terms. In an embodiment of the present application, the incorrect search term is corrected to hot terms with a small edit distance, thereby providing a better user experience.

As can be understood by those skilled in the art, the edit distance, also referred to as Levenshtein distance, refers to the minimum number of edition operations required to transform one string into the other. Conventional edit operations comprise: replacing one character by another character, inserting one character, deleting one character. Generally, the smaller the edit distance is, the greater the similarity of the two strings will be.

Conventional edit distance operations may include: replacing one character by another character, inserting one character, deleting one character, and each of the operations corresponds to an edit distance of 1. These operations neither include exchanges of adjacent characters in a string, nor take into account the particularity of replacing by characters with similar appearance or pronunciation. An exchange operation can be done by two replacement operations. For example, CD→DD→DC, the corresponding distance is 2 according to conventional edit distance algorithms. Considering that the probability that users input two characters with their positions exchanged is very high in the actual search process, it is unreasonable to have a distance of 2 for exchange operations. Furthermore, since the probability that users input incorrect search terms due to the characters with similar appearance or pronunciation is also higher, it is obviously unreasonable to set a distance of 1 for such special replacement operations without any particular treatment.

Accordingly, an embodiment of the present application provides a device for calculating a weighted edit distance, comprising:

an obtaining unit for obtaining a source string and a target string; and a calculation unit for calculating a weighted edit distance between the source string and the target string, wherein during the calculation of the weighted edit distance, different weights are set for different operations of transforming from the source string to the target string, respectively.

The calculation unit may comprise:

a state transition equation definition subunit for defining a state transition equation for representing the weighted edit distance between the source string and the target string, wherein, two state variables in the state transition equation are defined, which are used to represent characters at corresponding positions between the source string and the target string respectively; and a state transition equation solving subunit for solving the state transition equation in respective operations based on the different weights that are set for different operations, and obtaining the weighted edit distances based on the solutions of the state transition equation.

The different operations described above comprise the following five operations with their weights set respectively.

1) the weight of an operation of inserting characters is set to 1;

2) the weight of an operation of deleting characters is set to 1;

3) the weight of an operation of replacing by characters with dissimilar appearance or pronunciation is set to 1;

4) the weight of an operation of replacing by characters with similar appearance or pronunciation is set to w1;

5) the weight of an operation of exchanging characters is set to w2.

An error correction prompting unit 303 for selecting, from the pre-obtained hot terms, a predetermined number of hot terms based on the weighted edit distances and popularity of the pre-obtained hot terms for error correction prompt.

Optionally, the weighted edit distance calculation unit 302 comprises:

a state transition equation defining subunit 3021 for defining a state transition equation for representing the weighted edit distances between the search term and the hot terms, wherein two state variables in the state transition equation are defined, which are used to represent characters at corresponding positions between a search term and a hot term respectively; and an equation solving subunit 3022 for solving the state transition equation in respective operations based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters and obtaining the weighted edit distances based on the solutions of the state transition equation.

Optionally, the state transition equation is:

$$\text{edit}(i,j)=\min\{\text{edit}(i-1,j)+1,\text{edit}(i,j-1)+1,\text{edit}(i-1,j-1)+f(i,j)\};$$

wherein i and j are the two state variables, $f(i,j)$ is a cost of an operation, and costs $f(i,j)$ corresponding to the respective weights are obtained based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters.

Optionally, the operation of replacing by characters with similar appearance or pronunciation comprises:

determining whether the search term and the hot terms are characters with similar appearance or pronunciation by searching in a preset mapping table of characters with similar appearance or a preset mapping table of characters with similar pronunciation.

Optionally, the device further includes:

an operation weight setting unit 305 for setting weights of the operations based on the following relationship:

the weight for an operation of replacing by characters with similar appearance or pronunciation<the weight for an operation of exchanging characters<the weight for an operation of inserting characters=the weight for an operation of deleting characters=the weight for an operation of replacing by characters with dissimilar appearance or pronunciation. In order to obtain a better effect, special attention must be paid to the values of w1 and w2, in general, they need to meet w1<w2<1. It is concluded by experiments that, optionally, the operation weights can be set to meet the following relationship: the weight for an operation of replacing by characters with similar appearance or pronunciation<the weight for an operation of exchanging characters<the weight for an operation of inserting characters=the weight for an operation of deleting characters=the weight for an operation of replacing by characters with dissimilar appearance or pronunciation. Since various possible operations are considered are and given different weights respectively, by applying such weighted edit distance to perform error correction, a higher accuracy of the similarity calculated between strings can be obtained.

Optionally, the incorrect search term identification unit 301 comprises:

a log search and calculation subunit 3011 for analyzing or calculating, for a search term to be identified, a click rate for searching, term features, an occurrence probability, the number of full matching results, and a full matching ratio based on search logs.

Specifically, firstly, the click rate for searching of a search term to be identified is calculated, for example, the number of times that the search term to be identified was searched by users and the number of times that the search results were clicked by users may be obtained from search logs; the click rate for searching may be obtained by dividing the number of times that the search results were clicked by the number of searches; secondly, the search term to be identified is segmented to obtain a plurality of term features; afterwards, the probability of occurrence of the search term to be identified is calculated using a statistical language model and various term features; then, the number of full matching results and the number of relevant results of the search term to be identified are calculated, wherein, the number of full matching results is the number of the results, which contain the entire content of the search term to be identified, among all the search results for the search term to be identified; the number of relevant results is the number of the results, which contain part of the content of the search term to be identified, among all the search results for the search term to be identified; finally, the ratio of the number of full matching results and the number of relevant results is calculated to obtain the full matching ratio.

An identification result determination subunit 3012 for determining the search term to be identified as an incorrect search term or a normal search term based on the click rate for searching, the term features, the occurrence probability, the number of full matching results, and the full matching ratio for the search term to be identified.

By merging the features of the search term to be identified (namely, the click rate for searching, all of the term features, the occurrence probability of the search term to be identified, the number of full matching results and the full matching ratio) into a multi-dimensional feature, and identifying the search term to be identified based on the multi-dimensional feature, the difficulty of identifying the search term to be identified is reduced and thereby improves the ability to identify the search term to be identified, and it is advantageous to identify whether the search term to be identified as an incorrect search term.

Optionally, the error correction prompting unit 303 comprises:

a normalization subunit 3031 for normalizing the number of searches of the pre-obtained hot terms;

a recommendation comprehensive score calculation subunit 3032 for calculating recommendation comprehensive scores based on the weighted edit distances and results of normalizing the number of searches for the hot terms;

a recommendation term determination subunit 3033 for selecting, from the pre-obtained hot terms, a predetermined number of hot terms with the highest recommendation comprehensive score and with weighted edit distances less than a preset value, as recommendation terms for error correction to perform error correction prompt.

In order to explain the error correction device for search terms more clearly, the error correction device for search terms provided by the embodiment of the present application will be described hereafter in detail from another aspect.

The error correction device for search terms provided by the embodiment of the present application may comprise:

an incorrect search term identification unit, for identifying an incorrect search term;

a weighted edit distance calculation unit for calculating weighted edit distances between the identified search term and pre-obtained hot terms according to different weights that are set for the different operations of transforming from the search term to the hot terms, wherein the operations include: an operation of inserting characters, an operation of deleting characters, an operation of replacing by characters with similar appearance or pronunciation, an operation of replacing by characters with dissimilar appearance or pronunciation, and an operation of exchanging characters; and an error correction prompting unit for selecting, from the pre-obtained hot terms, a predetermined number of hot terms based on the weighted edit distances and popularity of the pre-obtained hot terms for error correction prompt.

In an implementation of the embodiment of the present application, the weighted edit distance calculation unit includes:

a state transition equation defining subunit for defining a state transition equation for representing the weighted edit distances between the identified search term and the pre-obtained hot terms, wherein two state variables in the state transition equation are defined, which are used to represent characters at a corresponding position between the identified search term and the pre-obtained hot terms respectively;

an equation solving subunit for solving the state transition equation in respective operations based on the different weights that are preset for an operation of inserting characters, an operation of deleting characters, an operation of replacing by characters with similar appearance or pronunciation, an operation of replacing by characters with dissimilar appearance or pronunciation, and an operation of exchanging characters, and obtaining the weighted edit distances based on the solutions of the state transition equation.

In an implementation of the embodiment of the present application, the state transition equation may be:

$$\text{edit}(i,j) = \min\{\text{edit}(i-1,j)+1, \text{edit}(i,j-1)+1, \text{edit}(i-1,j-1)+f(i,j)\};$$

wherein i and j are the two state variables, f(i,j) is a cost of an operation, and costs f(i,j) corresponding to the respective weights are obtained based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters.

In an implementation of the embodiment of the present application, the operation of replacing by characters with similar appearance or pronunciation comprises:

determining whether the search term and the hot terms are characters with similar appearance or pronunciation by searching in a preset mapping table of characters with similar appearance or a preset mapping table of characters with similar pronunciation.

In an implementation of the embodiment of the present application, the different weights that are preset for the operations of a transforming from the search term to the hot terms are based on the following relationship:

the weight for an operation of replacing by characters with similar appearance or pronunciation<the weight for an operation of exchanging characters<the weight for an operation of inserting characters=the weight for an operation of deleting characters=the weight for an operation of replacing by characters with dissimilar appearance or pronunciation.

In an implementation of the embodiment of the present application, the incorrect search term identification unit includes:

a log search and calculation subunit for analyzing or calculating, for a search term to be identified, a click rate for searching, term features, an occurrence probability, the number of full matching results, and a full matching ratio based on search logs; and an identification result determination subunit for determining the search term to be identified as an incorrect search term based on the click rate for searching, the term features, the occurrence probability, the number of full matching results, and the full matching ratio for the search term to be identified.

In an implementation of the embodiment of the present application, the error correction prompting unit includes:

a normalization subunit for normalizing the number of searches for the pre-obtained hot terms;

a recommendation comprehensive score calculation subunit for calculating recommendation comprehensive scores based on the weighted edit distances and results of normalizing the number of searches for the hot terms; and a recommendation term determination subunit for selecting, from the pre-obtained hot terms, a predetermined number of hot terms with the highest recommendation comprehensive score and with weighted edit distances less than a preset value, as recommendation terms for error correction to perform error correction prompt.

In the embodiment of the present application, by setting different weights for an operation of inserting characters, an operation of deleting characters, an operation of replacing by characters with similar appearance or pronunciation, an operation of replacing by characters with dissimilar appearance or pronunciation, and an operation of exchanging characters, all of the operations that may be involved in the transforming process from a search term to a hot term are adequately covered during the weighted edit distance calculation. Thus, the weighted edit distance between a search term and a hot term can be calculated more quickly and accurately, thereby improving the accuracy of search term error correction.

In order to explain the aforementioned device for calculating a weighted edit distance more clearly, the device for calculating a weighted edit distance provided by the embodiment of the present application will be described hereafter in detail from another perspective.

The device for calculating a weighted edit distance provided by the embodiment of the present application may comprise:

an obtaining unit, for obtaining a source string and a target string;

a calculation unit for setting different weights respectively for different operations of a transforming from the source string to the target string and calculating the weighted edit distance between the source string and the target string based on the different weights set for the different operations.

In an implementation of the embodiment of the present application, the calculation unit may include:

a state transition equation definition subunit for defining a state transition equation for representing the weighted edit distance between the source string and the target string, wherein, two state variables in the state transition equation are defined, which are used to represent characters at corresponding positions between the source string and the target string respectively; and a state transition equation solving subunit for solving the state transition equation in respective operations based on the different weights that are set for different operations, and obtaining the weighted edit distances based on the solutions of the state transition equation.

In the embodiments of the present application, since various possible operations are considered are and given different weights respectively, by applying such weighted edit distance to perform error correction, a higher accuracy of the similarity calculated between strings can be obtained.

Figure 4:
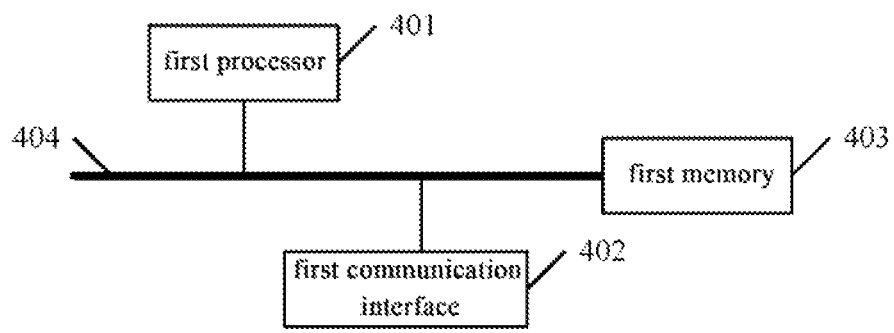
FIG. 4 is a first schematic structural diagram of an electronic device provided by an embodiment of the present application.

An embodiment of the present application further provides an electronic device, as shown in FIG. 4. The electronic device comprises a first processor 401, a first communication interface 402, a first memory 403 and a first communication bus 404, wherein the first processor 401, the first communication interface 402 and the first memory 403 communicate with each other via the first communication bus 404; the first memory 403 is used for storing computer programs; the first processor 401 is used for, when executing programs stored on the first memory 403, implementing the steps of the aforementioned error correction method for search terms. The method comprises:

identifying an incorrect search term;

calculating weighted edit distances between the identified search term and pre-obtained hot terms according to different weights that are set for the different operations of transforming from the search term to the hot terms, wherein the operations include: an operation of inserting characters, an operation of deleting characters, an operation of replacing by characters with similar appearance or pronunciation, an operation of replacing by characters with dissimilar appearance or pronunciation, and an operation of exchanging characters;

selecting, from the pre-obtained hot terms, a predetermined number of hot terms based on the weighted edit distances and popularity of the pre-obtained hot terms for error correction prompt.

In the embodiment of the present application, by setting different weights for an operation of inserting characters, an operation of deleting characters, an operation of replacing by characters with similar appearance or pronunciation, an operation of replacing by characters with dissimilar appearance or pronunciation, and an operation of exchanging characters, all of the operations that may be involved in the transforming process from a search term to a hot term are adequately covered during the weighted edit distance calculation. Thus, the weighted edit distance between a search term and a hot term can be calculated more quickly and accurately, thereby improving the accuracy of search term error correction.

In an implementation of the present application, calculating weighted edit distances between the identified search term and pre-obtained hot terms according to different weights that are set for the different operations of transforming from the search term to the hot terms comprises:

defining a state transition equation for representing the weighted edit distances between the identified search term and the pre-obtained hot terms, wherein two state variables in the state transition equation are defined, which are used to represent characters at a corresponding position between the identified search term and the pre-obtained hot terms respectively;

solving the state transition equation in respective operations based on the different weights that are preset for an operation of inserting characters, an operation of deleting characters, an operation of replacing by characters with similar appearance or pronunciation, an operation of replacing by characters with dissimilar appearance or pronunciation, and an operation of exchanging characters;

obtaining the weighted edit distances based on the solutions of the state transition equation.

In an implementation of the present application, the state transition equation is:

$$\text{edit}(i,j)=\min\{\text{edit}(i-1,j)+1, \text{edit}(i,j-1)+1, \text{edit}(i-1,j-1)+f(i,j)\};$$

wherein i and j are the two state variables, f(i,j) is a cost of an operation, and costs f(i,j) corresponding to the respective weights are obtained based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters.

In an implementation of the present application, the operation of replacing by characters with similar appearance or pronunciation comprises:

determining whether the search term and the hot terms are characters with similar appearance or pronunciation by searching in a preset mapping table of characters with similar appearance or a preset mapping table of characters with similar pronunciation.

In an implementation of the present application, the different weights that are preset for the operations of a transforming from the search term to the hot terms are based on the following relationship:

the weight for an operation of replacing by characters with similar appearance or pronunciation<the weight for an operation of exchanging characters<the weight for an operation of inserting characters=the weight for an operation of deleting characters=the weight for an operation of replacing by characters with dissimilar appearance or pronunciation.

In an implementation of the present application, identifying an incorrect search term includes:

analyzing or calculating, for a search term to be identified, a click rate for searching, term features, an occurrence probability, the number of full matching results, and a full matching ratio based on search logs; and determining the search term to be identified as an incorrect search term based on the click rate for searching, the term features, the occurrence probability, the number of full matching results, and the full matching ratio for the search term to be identified.

In an implementation of the present application, selecting, from the pre-obtained hot terms, a predetermined number of hot terms based on the weighted edit distances and popularity of the pre-obtained hot terms for error correction prompt comprises:

normalizing the number of searches for the pre-obtained hot terms;

calculating recommendation comprehensive scores based on the weighted edit distances and results of normalizing the number of searches for the hot terms; and selecting, from the pre-obtained hot terms, a predetermined number of hot terms with the highest recommendation comprehensive score and with weighted edit distances less than a preset value, as recommendation terms for error correction to perform error correction prompt.

An embodiment of the present application further provides a computer-readable storage medium with computer programs stored thereon, and when being executed by a processor, the computer programs enable the processor to implement the steps of the aforementioned error correction method for search terms. The method comprises:

identifying an incorrect search term;

calculating weighted edit distances between the identified search term and pre-obtained hot terms according to different weights that are set for the different operations of transforming from the search term to the hot terms, wherein the operations include: an operation of inserting characters, an operation of deleting characters, an operation of replacing by characters with similar appearance or pronunciation, an operation of replacing by characters with dissimilar appearance or pronunciation, and an operation of exchanging characters;

selecting, from the pre-obtained hot terms, a predetermined number of hot terms based on the weighted edit distances and popularity of the pre-obtained hot terms for error correction prompt.

In the embodiment of the present application, by setting different weights for an operation of inserting characters, an operation of deleting characters, an operation of replacing by characters with similar appearance or pronunciation, an operation of replacing by characters with dissimilar appearance or pronunciation, and an operation of exchanging characters, all of the operations that may be involved in the transforming process from a search term to a hot term are adequately covered during the weighted edit distance calculation. Thus, the weighted edit distance between a search term and a hot term can be calculated more quickly and accurately, thereby improving the accuracy of search term error correction.

In an implementation of the present application, calculating weighted edit distances between the identified search term and pre-obtained hot terms according to different weights that are set for the different operations of transforming from the search term to the hot terms comprises:

defining a state transition equation for representing the weighted edit distances between the identified search term and the pre-obtained hot terms, wherein two state variables in the state transition equation are defined, which are used to represent characters at a corresponding position between the identified search term and the pre-obtained hot terms respectively;

solving the state transition equation in respective operations based on the different weights that are preset for an operation of inserting characters, an operation of deleting characters, an operation of replacing by characters with similar appearance or pronunciation, an operation of replacing by characters with dissimilar appearance or pronunciation, and an operation of exchanging characters;

obtaining the weighted edit distances based on the solutions of the state transition equation.

In an implementation of the present application, the state transition equation is:

$$edit(i,j)=\min\{edit(i-1,j)+1, edit(i,j-1)+1, edit(i-1,j-1)+f(i,j)\};$$

wherein i and j are the two state variables, $f(i,j)$ is a cost of an operation, and costs $f(i,j)$ corresponding to the respective weights are obtained based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters.

In an implementation of the present application, the operation of replacing by characters with similar appearance or pronunciation comprises:

determining whether the search term and the hot terms are characters with similar appearance or pronunciation by searching in a preset mapping table of characters with similar appearance or a preset mapping table of characters with similar pronunciation.

In an implementation of the present application, the different weights that are preset for the operations of a transforming from the search term to the hot terms are based on the following relationship:

the weight for an operation of replacing by characters with similar appearance or pronunciation<the weight for an operation of exchanging characters<the weight for an operation of inserting characters=the weight for an operation of deleting characters=the weight for an operation of replacing by characters with dissimilar appearance or pronunciation.

In an implementation of the present application, identifying an incorrect search term includes:

analyzing or calculating, for a search term to be identified, a click rate for searching, term features, an occurrence probability, the number of full matching results, and a full matching ratio based on search logs; and determining the search term to be identified as an incorrect search term based on the click rate for searching, the term features, the occurrence probability, the number of full matching results, and the full matching ratio for the search term to be identified.

In an implementation of the present application, selecting, from the pre-obtained hot terms, a predetermined number of hot terms based on the weighted edit distances and popularity of the pre-obtained hot terms for error correction prompt comprises:

normalizing the number of searches for the pre-obtained hot terms;

calculating recommendation comprehensive scores based on the weighted edit distances and results of normalizing the number of searches for the hot terms; and selecting, from the pre-obtained hot terms, a predetermined number of hot terms with the highest recommendation comprehensive score and with weighted edit distances less than a preset value, as recommendation terms for error correction to perform error correction prompt.

Figure 5:
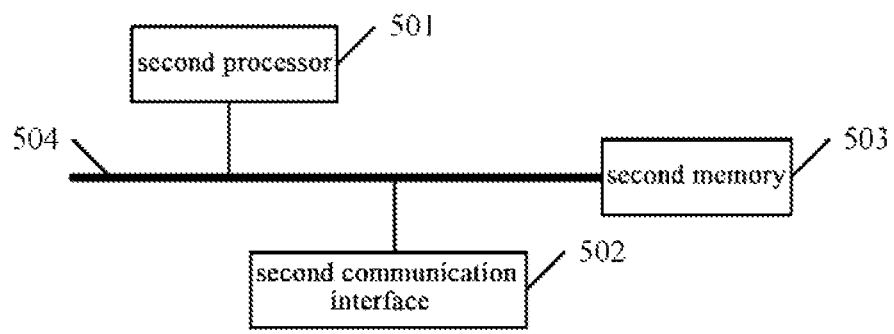
FIG. 5 is a second schematic structural diagram of an electronic device provided by an embodiment of the present application.

An embodiment of the present application further provides an electronic device, as shown in FIG. 5. The electronic device comprises a second processor 501, a second communication interface 502, a second memory 503 and a second communication bus 504, wherein the second processor 501, the second communication interface 502 and the second memory 503 communicate with each other via the second communication bus 504; the second memory 503 is used for storing computer programs; the second processor 501 is used for, when executing the programs stored on the second memory 503, implementing the steps of the aforementioned method for calculating a weighted edit distance. The method comprises:

obtaining a source string and a target string;

setting different weights respectively for different operations of a transforming from the source string to the target string, and calculating the weighted edit distance between the source string and the target string based on the different weights that are set for the different operations.

In the embodiments of the present application, since various possible operations are considered are and given different weights respectively, by applying such weighted edit distance to perform error correction, a higher accuracy of the similarity calculated between strings can be obtained.

In an implementation of the present application, calculating the weighted edit distance between the source string and the target string based on the different weights that are set for the different operations, comprises:

defining a state transition equation for representing the weighted edit distance between the source string and the target string, wherein, two state variables in the state transition equation are defined, which are used to represent characters at corresponding positions between the source string and the target string respectively;

solving the state transition equation in respective operations based on the different weights that are set for different operations; and obtaining the weighted edit distance based on the solutions of the state transition equation.

An embodiment of the present application further provides a computer-readable storage medium. The storage medium stores computer programs thereon which, when executed by a processor, enable to implement the steps of the aforementioned method for calculating a weighted edit distance. The method comprises:

obtaining a source string and a target string;

setting different weights respectively for different operations of a transforming from the source string to the target string, calculating the weighted edit distance between the source string and the target string based on the different weights that are set for the different operations.

In the embodiments of the present application, since various possible operations are considered are and given different weights respectively, by applying such weighted edit distance to perform error correction, a higher accuracy of the similarity calculated between strings can be obtained.

In an implementation of the present application, calculating the weighted edit distance between the source string and the target string based on the different weights that are set for the different operations, comprises:

defining a state transition equation for representing the weighted edit distance between the source string and the target string, wherein, two state variables in the state transition equation are defined, which are used to represent characters at corresponding positions between the source string and the target string respectively;

solving the state transition equation in respective operations based on the different weights that are set for different operations; and obtaining the weighted edit distance based on the solutions of the state transition equation.

Embodiments of apparatuses, electronic devices or storage media are simply described since they are essentially similar to embodiments of methods, and the relevant parts can refer to the parts of the description of embodiments of methods.

Various embodiments in the specification are described in a progressive manner, and the parts emphasized for each embodiment are the differences to other embodiments, thus same or similar parts between various embodiments can be referred to one another.

It will be understood by those skilled in the art that embodiments of the present application may be provided as a method, an apparatus, or a computer program product. Thus, embodiments of the present application may take the form of a hardware-only embodiment, a software-only embodiment, or an embodiment of a combination of software and hardware. Moreover, embodiments of the present application may take the form of computer program products implemented on one or more computer-usable storage media (including but not limited to disk storages, CD-ROMs, optical memories, etc.) containing computer usable program codes.

Embodiments of the present application are described with reference to flowcharts and/or block diagrams of methods, terminal devices (systems) and computer program products according to embodiments of the present application. It should be understood that each of the flows and/or blocks in the flowcharts and/or block diagrams, as well as a combination of the flows and/or blocks in the flowcharts and/or block diagrams, may be implemented by computer program instructions. These computer program instructions may be provided to a processor of a general purpose computer, a dedicated computer, an embedded processor, or other programmable data processing terminal device to generate a machine such that devices for implementing the functions specified in one or more flows in the flowcharts and/or specified in one or more blocks in the block diagrams are generated via instructions executed by a processor of a computer or other programmable data processing terminal device.

These computer program instructions may also be stored on a computer readable memory capable of operating a computer or other programmable data processing terminal device in a particular manner such that instructions stored on the computer readable memory produce a manufacturing product comprising an instruction device, the instruction device implements the functions specified in one or more flows in the flowcharts and/or specified in one or more blocks in the block diagrams.

These computer program instructions may also be loaded onto a computer or other programmable data processing terminal device such that a series of operational steps are performed on the computer or other programmable terminal device to generate computer-implemented processes. Thus, the instructions executed on the computer or other programmable terminal device provide the steps of implementing functions specified in one or more flows in the flowcharts and/or specified in one or more blocks in the block diagrams.

While optional embodiments of the present application have been described, those skilled in the art will be able to make further changes and modifications to these embodiments upon the knowledge of the basic inventive concepts. Therefore, the appended claims are intended to be construed as including the optional embodiments and all alternatives and modification within the scope of the embodiments of the present application.

Finally, it should be noted that, the relationship terms herein such as "first", "second" and the like, if any, are only used for distinguishing one entity or operation from another entity or operation, but do not necessarily require or imply that there is actual relationship or order between these entities or operations. Moreover, the terms "include", "comprise" or any variants thereof are intended to cover a non-exclusive inclusion, so that processes, methods, articles, or terminal devices comprising a series of elements comprise not only those elements listed but also those not specifically listed or elements intrinsic to these processes, methods, articles, or terminal devices. Without further limitations, elements defined by the sentences "comprise(s) a . . . " or "include(s) a . . . " do not exclude that there are other identical elements in the processes, methods, articles, or terminal devices which comprise these elements.

The error correction method and device for search terms provided by the present application have been described above in detail. The principles and embodiments of the present application are described with reference to particular examples and the above descriptions of the embodiments are merely for understanding the methods and core ideas of the present application. Meanwhile, modifications with respect to particular embodiments and application scope can be made by those skilled in the art based on the spirit of the present application. Overall, the content of the specification should not be interpreted as limitations to the present application.

What is claimed is:

1. An error correction method for search terms, comprising:

identifying an incorrect search term;

calculating weighted edit distances between the search term and pre-obtained hot terms by using a weighted edit distance algorithm, wherein, during the calculation of the weighted edit distances, different weights are set respectively for the following operations of transforming from the search term to the hot terms: an operation of inserting characters, an operation of deleting characters, an operation of replacing by characters with similar appearance or pronunciation, an operation of replacing by characters with dissimilar appearance or pronunciation, and an operation of exchanging characters;

setting weights of the operations such that: the weight for an operation of replacing by characters with similar appearance or pronunciation is less than the weight for an operation of exchanging characters, the weight for an operation of exchanging characters is less than the weight for an operation of inserting characters, the weight for an operation of inserting characters is equal to the weight for an operation of deleting characters and equal to the weight for an operation of replacing by characters with dissimilar appearance or pronunciation;

selecting a predetermined number of hot terms based on the weighted edit distances and popularity of the hot terms for error correction prompt;

wherein identifying an incorrect search term comprises:
   analyzing or calculating, for a search term to be identified, a click rate for searching, term features, an occurrence probability, the number of full matching results, and a full matching ratio based on search logs; and
   determining the search term to be identified as an incorrect search term or a normal search term based on the click rate for searching, the term features, the occurrence probability, the number of full matching results, and the full matching ratio for the search term to be identified; and wherein the analyzing or calculating, for a search term to be identified, a click rate for searching, term features, an occurrence probability, the number of full matching results, and a full matching ratio based on search logs comprises:
   calculating the click rate for searching of a search term to be identified;
   segmenting the search term to be identified to obtain a plurality of term features;
   calculating the probability of occurrence of the search term to be identified by using a statistical language model and the term features;
   calculating the number of full matching results and the number of relevant results of the search term to be identified, wherein, the number of full matching results is the number of the results, which contain the entire content of the search term to be identified, among all the search results for the search term to be identified; the number of relevant results is the number of the results, which contain part of the content of the search term to be identified, among all the search results for the search term to be identified; and
   calculating the ratio of the number of full matching results and the number of relevant results to obtain the full matching ratio.

2. The method according to claim 1, wherein calculating weighted edit distances between the search term and pre-obtained hot terms by using a weighted edit distance algorithm comprises:
   defining a state transition equation for representing the weighted edit distances between the search term and the hot terms, wherein two state variables in the state transition equation are defined, which are used to represent characters at corresponding positions between a search term and a hot term respectively;
   solving the state transition equation in respective operations based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters; and
   obtaining the weighted edit distances based on solutions of the state transition equation.

3. The method according to claim 2, wherein the state transition equation is:

$$\mathrm{edit}(i,j)=\min\{\mathrm{edit}(i-1,j)+1,\mathrm{edit}(i,j-1)+1,\mathrm{edit}(i-1,j-1)+f(i,j)\};$$

wherein i and j are the two state variables, $f(i,j)$ is a cost of an operation, and costs $f(i,j)$ corresponding to the respective weights are obtained based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters.

4. The method according to claim 1, wherein the method further comprises:
   determining whether the search term and the hot terms are characters with similar appearance or pronunciation by searching in a preset mapping table of characters with similar appearance or a preset mapping table of characters with similar pronunciation.

5. The method according to claim 1, wherein selecting a predetermined number of hot terms according to the weighted edit distances and popularity of the hot terms for error correction prompt comprises:
   normalizing the number of searches for the hot terms;
   calculating recommendation comprehensive scores based on the weighted edit distances and results of normalizing the number of searches for the hot terms; and
   selecting a predetermined number of hot terms with the highest recommendation comprehensive score and with weighted edit distances less than a preset value, as recommendation terms for error correction to perform error correction prompt.

6. An electronic device, comprising at least one processor, and a memory;
   the memory is used for storing computer programs;
   the processor is used for, when executing computer programs stored on the memory, performing the following operations:
   identifying an incorrect search term;
   calculating weighted edit distances between the search term and pre-obtained hot terms by using a weighted edit distance algorithm, wherein, during the calculation of the weighted edit distances, different weights are set respectively for the following operations of transforming from the search term to the hot terms: an operation of inserting characters, an operation of deleting characters, an operation of replacing by characters with similar appearance or pronunciation, an operation of replacing by characters with dissimilar appearance or pronunciation, and an operation of exchanging characters;
   setting weights of the operations such that: the weight for an operation of replacing by characters with similar appearance or pronunciation is less than the weight for an operation of exchanging characters, the weight for an operation of exchanging characters is less than the weight for an operation of inserting characters, the weight for an operation of inserting characters is equal to the weight for an operation of deleting characters and equal to the weight for an operation of replacing by characters with dissimilar appearance or pronunciation;
   selecting a predetermined number of hot terms based on the weighted edit distances and popularity of the hot terms for error correction prompt,
   wherein identifying an incorrect search term comprises:
      analyzing or calculating, for a search term to be identified, a click rate for searching, term features, an occurrence probability, the number of full matching results, and a full matching ratio based on search logs; and determining the search term to be identified as an incorrect search term or a normal search term based on the click rate for searching, the term features, the occurrence probability, the number of full matching results, and the full matching ratio for the search term to be identified; and wherein the analyzing or calculating, for a search term to be identified, a click rate for searching, term features, an occurrence probability, the number of full matching results, and a full matching ratio based on search logs comprises:

calculating the click rate for searching of a search term to be identified;

segmenting the search term to be identified to obtain a plurality of term features;

calculating the probability of occurrence of the search term to be identified by using a statistical language model and the term features;

calculating the number of full matching results and the number of relevant results of the search term to be identified, wherein, the number of full matching results is the number of the results, which contain the entire content of the search term to be identified, among all the search results for the search term to be identified; the number of relevant results is the number of the results, which contain part of the content of the search term to be identified, among all the search results for the search term to be identified; and calculating the ratio of the number of full matching results and the number of relevant results to obtain the full matching ratio.

7. A non-transitory computer-readable storage medium with computer programs stored thereon, when being executed by a processor, the computer programs enable the processor to implement the steps of the method according claim 1.

8. The electronic device according to claim 6, wherein calculating weighted edit distances between the search term and pre-obtained hot terms by using a weighted edit distance algorithm comprises:

defining a state transition equation for representing the weighted edit distances between the search term and the hot terms, wherein two state variables in the state transition equation are defined, which are used to represent characters at corresponding positions between a search term and a hot term respectively;

solving the state transition equation in respective operations based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters; and obtaining the weighted edit distances based on solutions of the state transition equation.

9. The electronic device according to claim 8, wherein the state transition equation is:

$$\text{edit}(i,j)=\min\{\text{edit}(i-1,j)+1,\text{edit}(i,j-1)+1,\text{edit}(i-1,j-1)+f(i,j)\};$$

wherein i and j are the two state variables, f(i,j) is a cost of an operation, and costs f(i,j) corresponding to the respective weights are obtained based on the different weights that are set for an operation of inserting characters, an operation of deleting characters, an operation of replacing by characters with similar appearance or pronunciation, an operation of replacing by characters with dissimilar appearance or pronunciation, and an operation of exchanging characters.

10. The electronic device according to claim 6, wherein the processor is used for, when executing computer programs stored on the memory, performing the following operation:

determining whether the search term and the hot terms are characters with similar appearance or pronunciation by searching in a preset mapping table of characters with similar appearance or a preset mapping table of characters with similar pronunciation.

11. The electronic device according to claim 6, wherein selecting a predetermined number of hot terms according to the weighted edit distances and popularity of the hot terms for error correction prompt comprises:

normalizing the number of searches for the hot terms;

calculating recommendation comprehensive scores based on the weighted edit distances and results of normalizing the number of searches for the hot terms; and selecting a predetermined number of hot terms with the highest recommendation comprehensive score and with weighted edit distances less than a preset value, as recommendation terms for error correction to perform error correction prompt.

* * * * *